(12) United States Patent
Teunen et al.

(10) Patent No.: US 8,271,875 B2
(45) Date of Patent: Sep. 18, 2012

(54) PROVIDING HELP INFORMATION

(75) Inventors: Remco Teunen, Menlo Park, CA (US); Suzanne R. Liu, San Mateo, CA (US); Heather S. Cash, Mountain View, CA (US)

(73) Assignee: Google Inc., Mountain View, CA (US)

( * ) Notice: Subject to any disclaimer, the term of this patent is extended or adjusted under 35 U.S.C. 154(b) by 449 days.

(21) Appl. No.: 12/246,789

(22) Filed: Oct. 7, 2008

(65) Prior Publication Data

US 2010/0088601 A1 Apr. 8, 2010

(51) Int. Cl.
G06F 3/00 (2006.01)
(52) U.S. Cl. .......... 715/705; 715/714
(58) Field of Classification Search .......... 715/705, 715/714
See application file for complete search history.

(56) References Cited

U.S. PATENT DOCUMENTS

| | | | | |
|---|---|---|---|---|
| 6,799,198 B1 * | 9/2004 | Huboi et al. | | 709/203 |
| 6,895,552 B1 * | 5/2005 | Balabanovic et al. | | 715/209 |
| 6,983,271 B2 * | 1/2006 | Morrow et al. | | 1/1 |
| 6,990,532 B2 * | 1/2006 | Day et al. | | 709/245 |
| 7,024,658 B1 * | 4/2006 | Cohen et al. | | 717/117 |
| 7,343,307 B1 * | 3/2008 | Childress | | 705/4 |
| 7,543,232 B2 * | 6/2009 | Easton et al. | | 715/708 |
| 7,849,405 B1 * | 12/2010 | Coletta et al. | | 715/708 |
| 7,895,243 B1 * | 2/2011 | Baer et al. | | 707/805 |
| 8,069,413 B2 * | 11/2011 | Methot | | 715/705 |
| 2002/0007285 A1 * | 1/2002 | Rappaport | | 705/2 |
| 2006/0195439 A1 * | 8/2006 | Selberg | | 707/5 |
| 2006/0259861 A1 * | 11/2006 | Watson | | 715/705 |
| 2007/0106627 A1 * | 5/2007 | Srivastava et al. | | 706/20 |
| 2008/0114756 A1 * | 5/2008 | Konig et al. | | 707/5 |
| 2010/0223550 A1 * | 9/2010 | Iizuka et al. | | 715/708 |

* cited by examiner

*Primary Examiner* — William Bashore
*Assistant Examiner* — David Phantana Angkool
(74) *Attorney, Agent, or Firm* — Fish & Richardson P.C.

(57) ABSTRACT

A computer-implemented method for providing content includes extracting preconfigured content from an application; selecting, from second content associated with the application, a plurality of portions of the second content using the extracted preconfigured content; ranking the plurality of portions based at least in part on the preconfigured content; and associating a reference with the preconfigured content in the application such that the reference is displayed with the application, the reference providing user navigation to at least one of the plurality of portions selected based on the ranking.

21 Claims, 4 Drawing Sheets

PROVIDING HELP INFORMATION

TECHNICAL FIELD

This document generally describes information presentation.

BACKGROUND

Help information is a common source of frustration for users. Often, a user does not know the key terms that are required to solve their problem. As the computer world expands, more help information is generated for the user to read to try and determine what is needed to complete a desired task.

There are many approaches to providing help information. Users can provide their own help information on forums. The product can provide internally generated help information. Help information can be listed using topics or listing alphabetical entries. Similar products can have similar approaches to general functions, such as the open apple key used in conjunction with the "c" key on an Apple computer to copy a highlighted item on the user's screen. Other times, a function in a product can be product-specific, with no other products being able to produce the same function.

SUMMARY

This document describes techniques for providing content (e.g., help information). In general, preconfigured content can be used to determine related portions of help information, and the system may then rank the help information to generate references to be displayed with the content in an application.

In one implementation, a computer-implemented method for providing content (e.g., help information) is described. The method includes extracting preconfigured content from an application; selecting, from second content (e.g., help information) associated with the application, a plurality of portions of the second content using the extracted preconfigured content; ranking the plurality of portions based at least in part on the preconfigured content; and associating a reference with the preconfigured content in the application such that the reference is displayed with the application, the reference providing user navigation to at least one of the plurality of portions selected based on the ranking.

In a second implementation, an electronic system for providing content (e.g., help information) is described. The system includes a content extractor to extract preconfigured content from an application; a selector to select, from second content (e.g., help information) associated with the application, a plurality of portions of the second content using the extracted preconfigured content; a ranking module to rank the plurality of portions based at least in part on the preconfigured content; and a reference association module to associate a reference with the preconfigured content in the application such that the reference is displayed with the application, the reference providing user navigation to at least one of the plurality of portions selected based on the ranking.

In another implementation, an electronic system for providing content (e.g., help information) is described. The system includes a content extractor to extract preconfigured content from an application; a selector to select, from second content associated with the application, a plurality of portions of the second content using the extracted preconfigured content; a ranking module to rank the plurality of portions based at least in part on the preconfigured content; and means for associating a reference with the preconfigured content in the application such that the reference is displayed with the application, the reference providing user navigation to at least one of the plurality of portions selected based on the ranking.

In still another implementation, a computer program embodied on a computer-readable storage medium for providing content is described. The computer program includes extracting preconfigured content from an application; selecting, from second content (e.g., help information) associated with the application, a plurality of portions of the second content using the extracted preconfigured content; ranking the plurality of portions based at least in part on the preconfigured content; and associating a reference with the preconfigured content in the application such that the reference is displayed with the application, the reference providing user navigation to at least one of the plurality of portions selected based on the ranking.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
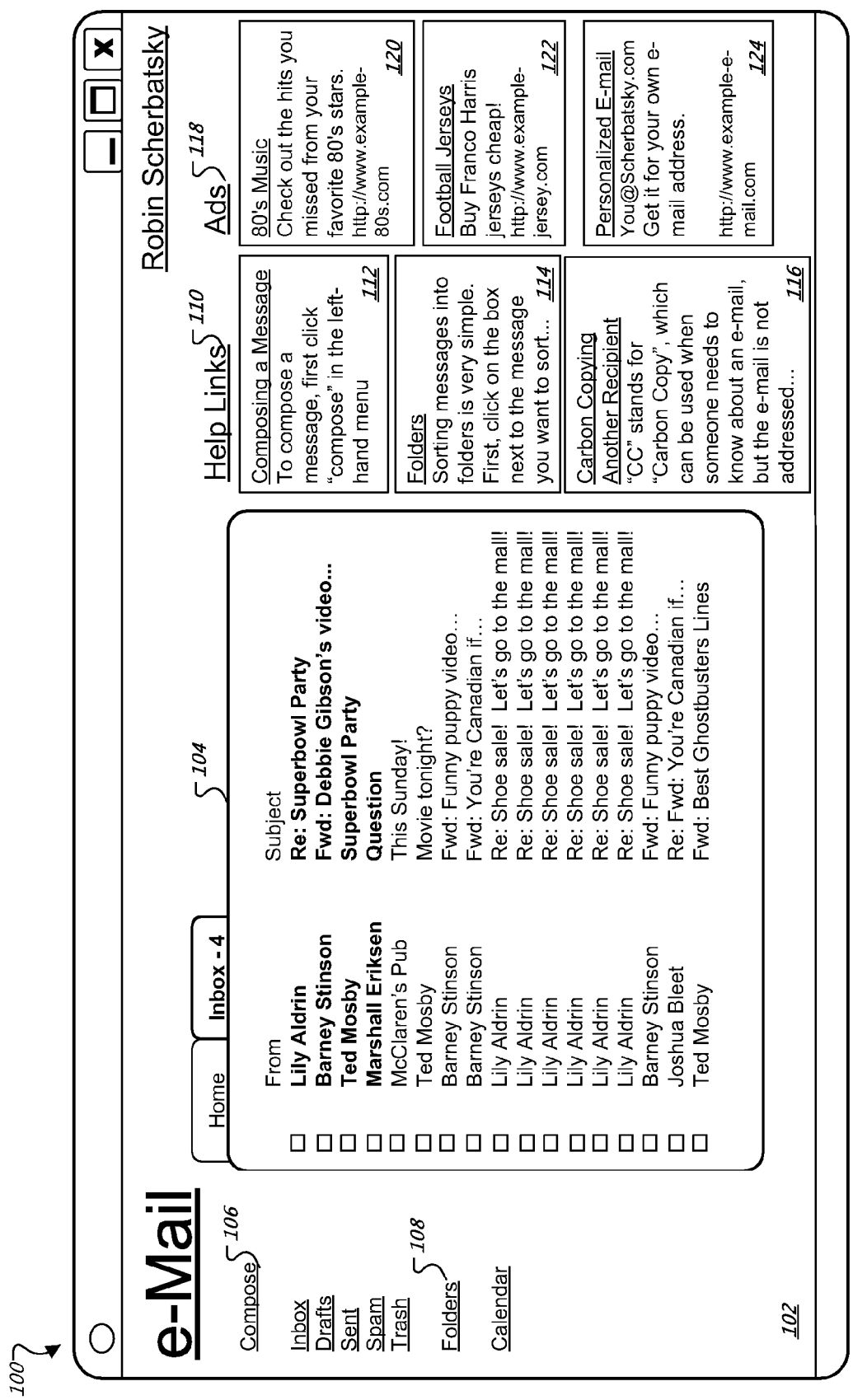
FIG. 1 is a an example of a graphical user interface for providing content.

FIG. 1 is an example of a graphical user interface (GUI) 100 for providing content (e.g., help information). The GUI 100 displays an application 102 on a user device. The GUI 100, shown here as an e-mail application, provides a user with references linked to content (e.g., help information) related to the current screen in the application 102. By way of example, reference will be made below in the following description to providing one specific form of content to the user, namely help information. Help information is one example of related content that can be presented. Other forms of content are possible. To determine the help references for display, content can be extracted from the application 102 to select portions of related help information. The selected help information can be ranked based on the extracted content. The help information can be linked to help references that are then displayed in the application 102. The help references can be displayed inside the application 102 so that the user can view help references alongside the application 102 for ease of use. Alternatively, the help references can be displayed in a separate or otherwise designated area for easy of identification.

In the example shown in FIG. 1, the application 102 provides the user with an inbox 104, a selection for actions, such as "Compose" 106 and "Folders" 108. The GUI 100 also displays a Help Links 110 header for help information. Underneath the Help Links 110 header, individual references 112-116 are displayed. The displayed references 112-116 show content headers providing a brief description of the reference topic. The content headers can be similar or the same as a portion of help information associated with the reference. For example, the first reference 112 is shown as having the header "Composing a Message."

The help information can be determined by a variety of methods. For example, the extracted preconfigured content from the application 102 can include topics and keywords from the current display on the GUI 100. The topics and keywords may be available to the user, but other topics and keywords may not be displayed to the user. As shown, "Compose" 106 relates to the first reference 112, and Folders 108 relates to the second reference 114. However, the third reference 116 does not directly relate to a term displayed in the GUI 100. In one implementation, the term "carbon copy" may be associated with "Compose" 106 so that if "Compose" 106 is onscreen, "carbon copy" is a term that can be extracted. The keywords and topics associated with a current display can be used to determine references 112-116.

As shown, the GUI 100 displays three references 112-116 in the application 102. The number of references displayed in the application 102 can be predetermined (e.g. five references must be displayed under the Help Links 110 header). Likewise, the number of ranked portions to be associated with the reference can be determined using a percentile cutoff. For example, if each portion of help information is ranked to be relevant based on keywords and topics, that relevancy can be determined as a percentage. The displayed references 112-116 may be required to have a ranking of 75% or higher to be displayed. Alternatively, the references 112-116 can have an option to display different help references.

Once the references 112-116 are displayed, the GUI 100 can receive feedback from the user to rank the references 112-116. This feedback can be passive or active. For example, a passive means of retrieving feedback can use the user's selection of one of the references 112-116 to recalculate a reference's ranking. If more users select the first reference 112, that reference can have a higher rank than it would from only keywords and topics. Similarly, the references that are not chosen 114-116 may decrease in their ranking so that other references are shown with the application 102 with the same or similar content extracted.

Active means of retrieving user feedback can also be implemented. For example, a window can appear to accept user feedback, asking the user to choose whether the reference 112 was helpful. Similarly, the GUI 100 can display a ranking system for feedback from the user, such as a star ranking system or a scale from 1 to 10. Likewise, a user choosing a reference 112 from other references 114-116 displayed alongside the reference 112 can provide feedback. This user feedback can be used for later rankings. In some implementations, ranking feedback can be obtained from the related help information after the user has selected one of the references 112-116.

As shown in FIG. 1, the GUI 100 can also display an ads header 118 with individual advertisements 120-124 related to the extracted content from the application 102. For example, in FIG. 1, the advertisement 120 "80's Music" is related to the "Debbie Gibson" text in the inbox 104. Likewise, the advertisement 122 "Football Jerseys" is related to the text "Superbowl Party" in the inbox 104. The advertisement 124 "Personalized E-mail" is related to the name "Robin Scherbatsky" in the application 102 and the type of application being an e-mail application. The application 102 may display other content-related data, such as news information, weather information, maps, videos, etc.

Figure 2:
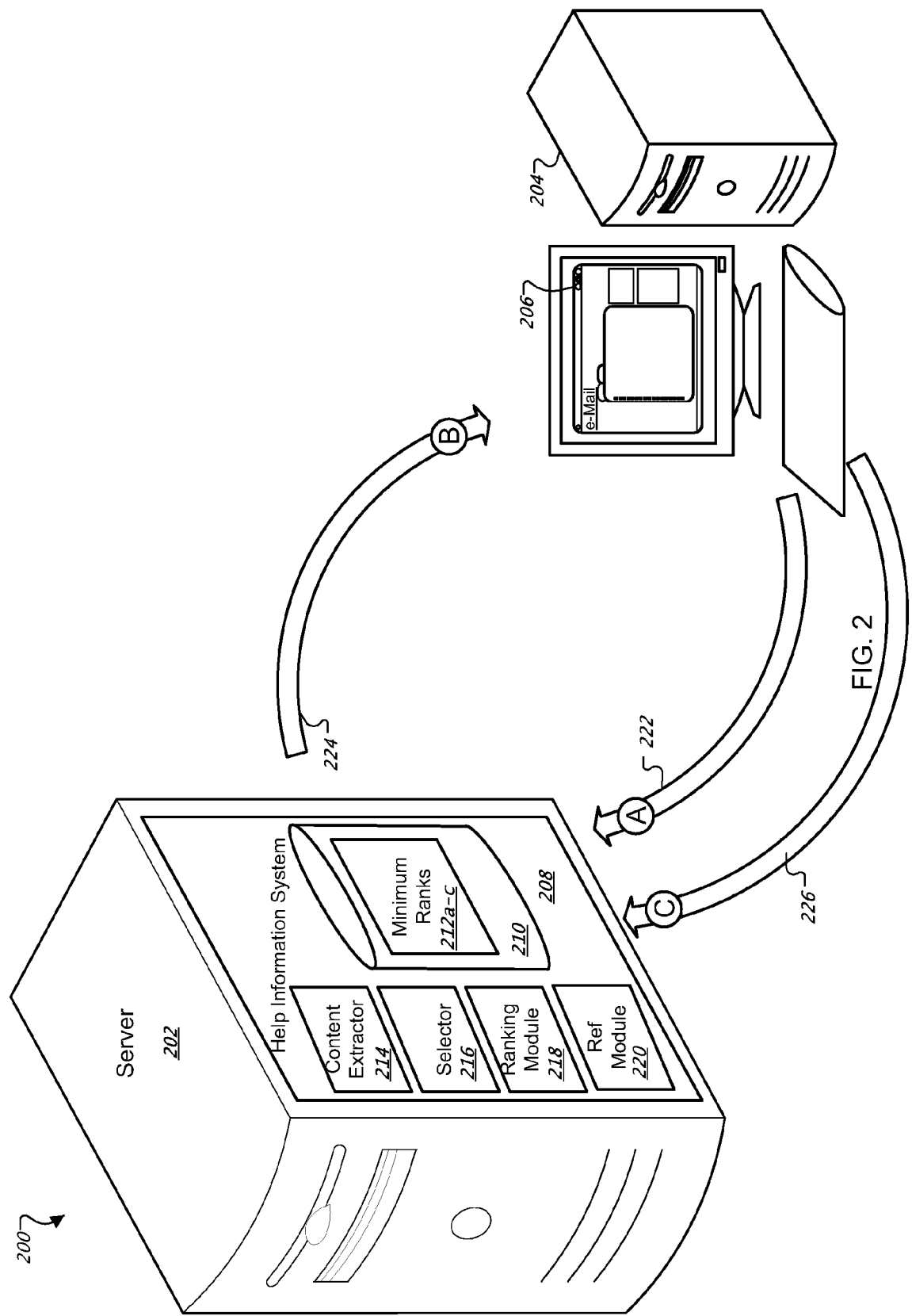
FIG. 2 is a block diagram of a system for providing content.

FIG. 2 is a block diagram of a system 200 for providing content (e.g., help information). The system 200 shows an example of extracting content from an application, selecting portions of second content (e.g., help information) based on that extracted content, ranking the second content based on the extracted content, and associating references with the extracted content. The system 200 includes a server 202, a user device 204, and an application display 206.

The server 202 includes a help information system 208. The help information system 208 has a database 210 including minimum ranks data stores 212a-c. The help information system 208 also has a content extractor 214, a selector 216, a ranking module 218, and a reference association module 220.

The database 210 can store help information along with minimum ranking information stored in the minimum ranks data stores 212a-c for each of the portions of help information in the database 210. The plurality of portions of the help information each have a predetermined rank that is modifiable. For example, a new portion of help information can have a default ranking so that terms within the help information trigger a 50% ranking. As discussed in FIG. 1, this ranking system can be used to determine which portions of help information are most relevant to a particular application display 206.

The application display 206 can contain content that the system 200 can extract 222 to be processed by the help information system 208. For example, the content extractor 214 can extract preconfigured content from an application to determine keywords and terms from the content of the application display 206. The content extractor can also use content not previously configured to be used as a keyword or term. For example, the application display 206 can have a display similar to FIG. 1, where the inbox 104 displays the term "video" several times in the subject line. The "video" term can display a reference 112 discussing the ability to display an attached video file in the application.

Once the content is extracted from the application display 206, the selector 216 can select portions of the help information from the database 210 using the extracted preconfigured content. The portions of help information can be associated with the application. The selector 216 can use, for example, keywords and terms extracted from the application display 206 by the content extractor 214. In some implementations, the selector 216 only provides a predetermined number of portions of help information based on previously known rankings.

With portions of help information identified by the selector 216, the ranking module 218 can rank the plurality of portions based at least in part on the preconfigured content. For example, the ranking module 218 can evaluate the current ranking of each of the portions of help information identified by the selector and determine the likelihood that the help information matches the extracted preconfigured content. In some implementations, the content extractor 214 can take a term, like "Compose" and provide it to the selector 216. The selector 216 can find portions of help information with the term "compose" (in some instances, including close matches such as "composing"). The ranking module 218 can then evaluate the relevancy of portions of help information associated with the "compose" term. The ranking module 218 can also use data provided by an administrator to rank the plurality of portions of help information. For example, if an administrator provides a score to the help information associated with the first reference 112 in FIG. 1 for the term "Compose," the ranking module 218 can rank that portion of help information based on the high score and provide that portion when the term "compose" appears on the application display 206.

Likewise, the ranking module 218 can determine the ranking of portions of help information based on multiple terms. In some implementations, each term may be determined to have its own weight from the application display 206 itself, from the content extractor 214, or from other sources. Further, the ranking of portions may be adjusted individually based on passive or active user feedback, as described in FIG. 1. If user chooses a particular reference by clicking on the reference, the ranking module 218 can increase the reference's ranking.

Once the portions of help information are ranked, the reference association module 220 can associate a reference with the preconfigured content in the application such that the reference is displayed with the application. The reference can provide user navigation to at least one of the plurality of portions selected based on the ranking. The reference association module 220 can generate the reference based on the extracted content and the portions of help information provided. For example, the reference association module 220 can generate a content header for the reference using the extracted preconfigured content, so that the term "compose" is the header of a reference providing user navigation to a portion of help information associated with "compose" actions. Alternatively, the reference association module 220 can retrieve previously generated references associated with portions of help information.

Once the references associated with the ranked portions of help information are determined, the references can be displayed 224 on the user device 204 in the application display 206. In some implementations, the references can be displayed 224 at the same time that a user navigates to the preconfigured content. In some implementations, the user can choose to activate the references in the application display 206. In some implementations, the references can be displayed 224 after the application display 206 has loaded. For example, the references can be displayed 224 when the user selects a related portion of the application display 206.

The references displayed 224 can contain the entire portion of the help information. However, in some implementations, only a proper subset of the reference may be displayed 224 with the application display 206, the reference being displayed 224 after a user selects the proper subset. For example, a content header of a reference may be displayed. If a user selects that content header by rolling over the content header with her mouse, the content header can expand in the application display 206 to show the full reference.

As mentioned in FIG. 1, the user's selection can be used to update 226 the ranking of portions of help information. This can be accomplished through passive or active means. For example, the user rolling over a content header to obtain more information can be used to increase the ranking of the associated help information. Alternatively, users from a particular geographic location who receive a reference more often than users from other locations may have that reference ranked higher for their location. Likewise, the system 200 can periodically refresh the preconfigured content. For example, the preconfigured content can be updated so that new terms and keywords can be associated with the content, allowing for better help information to be available to the user.

Figure 3:
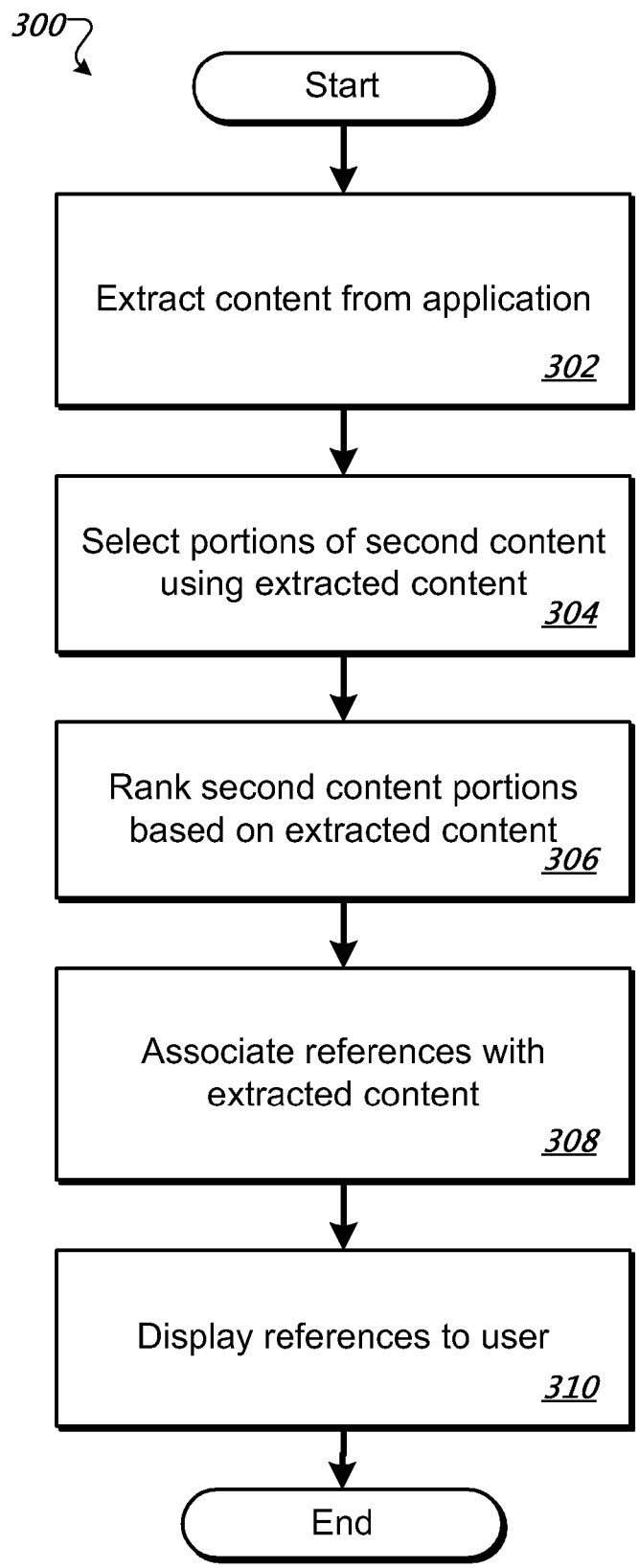
FIG. 3 is an example of a method for providing content.

FIG. 3 is an example of a method 300 for presenting content (e.g., help information). For example, the method 300 can be performed to provide help information similar, or corresponding, to the help information in the graphical user interface 100. The method 300 can be performed by a processor executing instructions stored in a computer-readable storage medium.

In step 302 preconfigured content is extracted from an application. For example, the preconfigured content can include a word that appears multiple times in the application, such as the word "video" in FIG. 1. A word appearing multiple times in the current display can be extracted as preconfigured content, as can an image with related terms. For example, if an icon appears on a page, that icon can be used as a term.

The method 300 includes, in step 304, selecting a plurality of portions of second content (e.g., help information) using the extracted preconfigured content. The help information can be associated with the application. For example, the preconfigured content can be an icon representing the copy function. Using the icon, the method 300 can find portions of help information relating to the application's copy function.

In some implementations, the help information associated with the application can be generated by users of the application. For example, there may be help references created by users regarding use of the application available on the Internet. The method 300 can search help information in an online forum discussing the application and use its content as portions of help information.

Once the plurality of portions of second content have been selected, it is ranked based at least in part on the preconfigured content in step 306. For example, "Compose" 106 can be related to a portion of help information associated with first reference 112 in FIG. 1 and a portion of help information associated with the third reference 116. However, "Compose" can relate more with the portion of help information associated with first reference 112 than the portion of help information associated with the third reference 116. The method 300 can rank the portions of help information based on their relatedness to the preconfigured content so that the most pertinent information is displayed to the user.

Step 308 associates references with the preconfigured content in the application such that the reference is displayed with the application. The reference can provide user navigation to at least one of the plurality of portions of help information selected based on the ranking. For example, the first reference 112 in FIG. 1 appears in the application 102. The reference 112 can provide user navigation through a hyperlink to a portion of help information that discusses a step-by-step process for composing an e-mail. In some implementations, the reference is generated at least in part from the preconfigured content in the application. For example, the content header of each of the references 112-116 in FIG. 1 can be composed of key words and terms, like "Compose," "Folders," and "Carbon Copy."

With the ranked references providing navigation to the second content (e.g., help information), the method 300 can display the references to the user in step 310. As shown in FIG. 1, the references 112-116 can be displayed in the GUI 100 along the user's inbox 104, but still in the application 102. Likewise, the references can be displayed such that the user can click on a tab, like the inbox or home tabs in FIG. 1, to access the references for a given screen. The user can also elect to "pop-out" the references to a separate window, or "pop-in" the references into the current application.

In some implementations, the method 300 can determine the relationship between help information and the predetermined content using a separate product that determines how long a user was on a particular display and her geographic position. The product can provide information to determine which references users find to be more helpful. One such product may be GOOGLE ANALYTICS.

Figure 4:
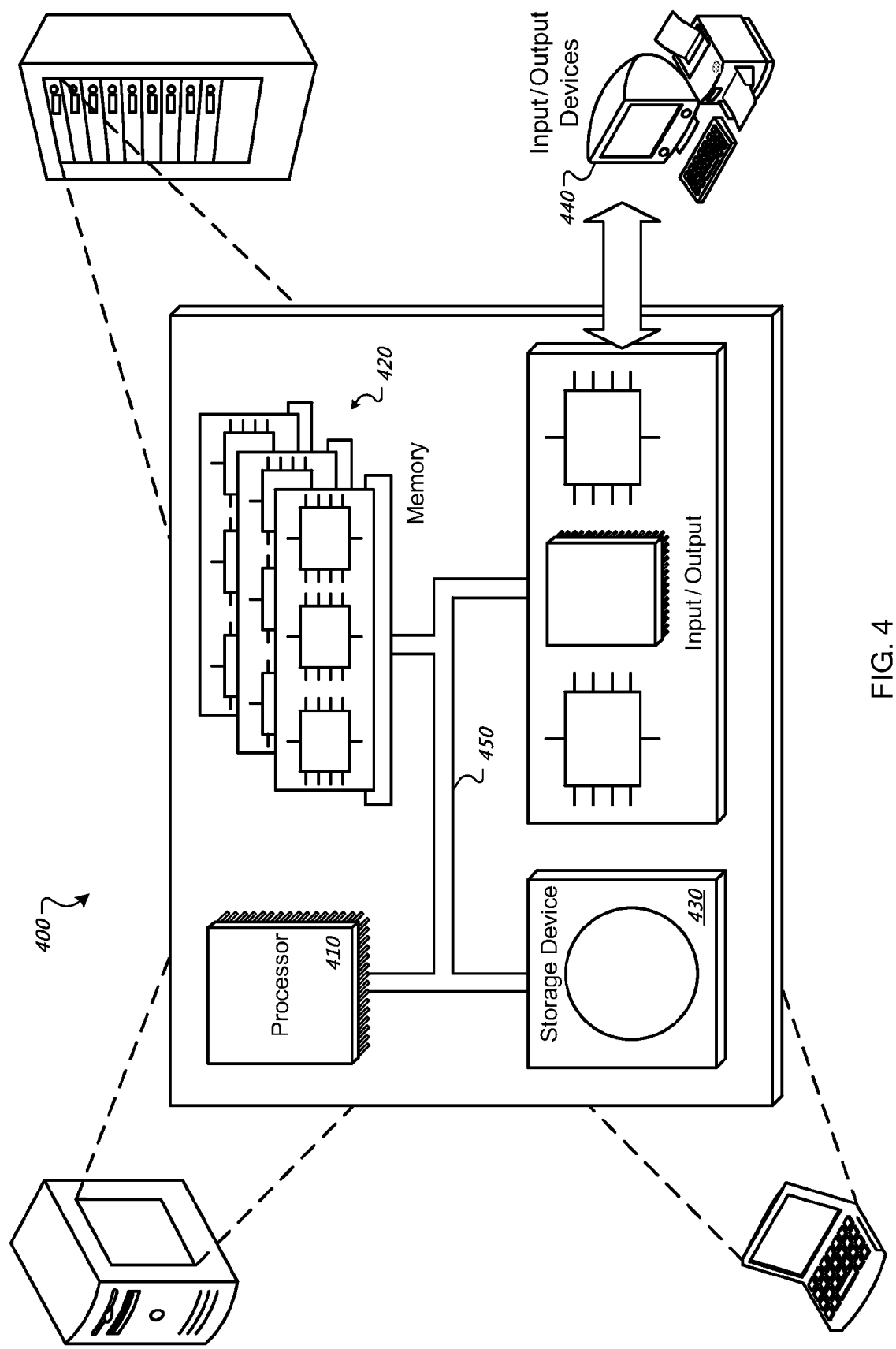
FIG. 4 is a schematic diagram of a computer system.

FIG. 4 is a schematic diagram of a computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for providing help information may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for providing help information, comprising:
   extracting, by a content extractor, preconfigured content from an application display of an application, the preconfigured content including multiple first terms;
   selecting, from second content associated with the application, a plurality of portions of the second content using the extracted preconfigured content, each of the portions including one or more second terms;
   ranking the plurality of portions based at least in part on the preconfigured content, the ranking including performing a relevance evaluation of the one or more second terms with regard to the first terms, each of the first terms having its own determined weight in the relevance evaluation, wherein each of the determined weights is from the application display or the content extractor; and associating a reference with the preconfigured content in the application such that the reference is displayed with the application, the reference providing user navigation to at least one of the plurality of portions selected based on the ranking.

2. The method of claim 1, wherein the reference contains a content header from the portion of the second content associated with the reference.

3. The method of claim 1, further comprising displaying the reference at the same time that a user navigates to the preconfigured content.

4. The method of claim 1, wherein the reference is generated at least in part from the preconfigured content in the application.

5. The method of claim 1, further comprising determining a number of ranked portions of the second content to be associated with the reference.

6. The method of claim 1, wherein the extracted preconfigured content includes topics and keywords from a current user display for the application.

7. The method of claim 1, wherein the second content is help information associated with the application and is generated by sources external to the application.

8. The method of claim 7, wherein the second content is help information associated with the application and is generated by users of the application.

9. The method of claim 1, wherein the plurality of portions of the second content each have a predetermined rank that is modifiable.

10. The method of claim 1, further comprising receiving feedback from the user to rank the helpfulness of the reference.

11. The method of claim 10, further comprising incorporating the user feedback for later rankings.

12. The method of claim 10, wherein the ranking of a portion is based at least in part on the number of times an associated reference has been selected.

13. The method of claim 1, further comprising determining the relationship between the second content and the predetermined content.

14. An electronic system for providing help information, comprising:
one or more processors; and
a computer-readable storage medium having stored therein instructions that when executed cause the one or more processors to generate:
a content extractor to extract preconfigured content from an application display of an application, the preconfigured content including multiple first terms;
a selector to select, from second content associated with the application, a plurality of portions of the second content using the extracted preconfigured content, each of the portions including one or more second terms;
a ranking module to rank the plurality of portions based at least in part on the preconfigured content, the ranking including performing a relevance evaluation of the one or more second terms with regard to the first terms, each of the first terms having its own determined weight in the relevance evaluation, wherein each of the determined weights is from the application display or the content extractor; and
a reference association module to associate a reference with the preconfigured content in the application such that the reference is displayed with the application, the reference providing user navigation to at least one of the plurality of portions selected based on the ranking.

15. The system of claim 14, further comprising a proper subset of the reference being displayed with the application, the reference being displayed after a user selects the proper subset.

16. The system of claim 14, further comprising the electronic system periodically refreshing the preconfigured content.

17. The system of claim 14, wherein the selector only provides a predetermined number of portions of the second content based on previously known rankings.

18. The system of claim 14, wherein the ranking module ranks the plurality of portions based at least in part on data provided by an administrator.

19. The system of claim 14, further comprising displaying the reference when the user selects a related portion of the application.

20. An electronic system for providing help information, comprising:
one or more processors;
a computer-readable storage medium having stored therein instructions that when executed cause the one or more processors to generate:
a content extractor to extract preconfigured content from an application display of an application, the preconfigured content including multiple first terms;
a selector to select, from second content associated with the application, a plurality of portions of the second content using the extracted preconfigured content, each of the portions including one or more second terms; and
a ranking module to rank the plurality of portions based at least in part on the preconfigured content, the ranking including performing a relevance evaluation of the one or more second terms with regard to the first terms, each of the first terms having its own determined weight in the relevance evaluation, wherein each of the determined weights is from the application display or the content extractor; and
means for associating a reference with the preconfigured content in the application such that the reference is displayed with the application, the reference providing user navigation to at least one of the plurality of portions selected based on the ranking.

21. A computer program embodied on a computer-readable storage medium for providing help information, the computer program when executed causing operations to be performed comprising:
extracting, by a content extractor, preconfigured content from an application display of an application, the preconfigured content including multiple first terms;
selecting, from second content associated with the application, a plurality of portions of the second content using the extracted preconfigured content, each of the portions including one or more second terms;
ranking the plurality of portions based at least in part on the preconfigured content, the ranking including performing a relevance evaluation of the one or more second terms with regard to the first terms, each of the first terms having its own determined weight in the relevance evaluation, wherein each of the determined weights is from the application display or the content extractor; and
associating a reference with the preconfigured content in the application such that the reference is displayed with the application, the reference providing user navigation to at least one of the plurality of portions selected based on the ranking.

* * * * *

UNITED STATES PATENT AND TRADEMARK OFFICE
CERTIFICATE OF CORRECTION

| | | |
|---|---|---|
| PATENT NO. | : 8,271,875 B2 | Page 1 of 1 |
| APPLICATION NO. | : 12/246789 | |
| DATED | : September 18, 2012 | |
| INVENTOR(S) | : Remco Teunen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this
Nineteenth Day of August, 2014

Michelle K. Lee
*Deputy Director of the United States Patent and Trademark Office*